United States Patent [19]

Konishi

[11] Patent Number: 5,739,957

[45] Date of Patent: Apr. 14, 1998

[54] OBJECTIVE LENS SYSTEM FOR FLUORESCENCE MICROSCOPES

[75] Inventor: Hirokazu Konishi, Hachioji, Japan

[73] Assignee: Olympus Optical Co., Ltd., Tokyo, Japan

[21] Appl. No.: 391,222

[22] Filed: Feb. 17, 1995

[30] Foreign Application Priority Data

Feb. 18, 1994 [JP] Japan ................. 6-043320

[51] Int. Cl.$^6$ ............................................ G02B 21/02
[52] U.S. Cl. ........................................ 359/659; 359/658
[58] Field of Search ............................... 359/656, 657, 359/658, 659, 660, 661, 771–773, 764–766, 757–758, 713–716, 784–785

[56] References Cited

U.S. PATENT DOCUMENTS

| | | | |
|---|---|---|---|
| 3,118,964 | 1/1964 | Buzawa | 359/658 |
| 5,444,573 | 8/1995 | Saito | 359/661 |
| 5,517,360 | 5/1996 | Suzuki | 359/656 |

FOREIGN PATENT DOCUMENTS

| | | |
|---|---|---|
| 55-79406 | 6/1980 | Japan. |
| 59-155822 | 9/1984 | Japan. |
| 61-275811 | 12/1986 | Japan. |
| 61-275813 | 12/1986 | Japan. |
| 5-142477 | 6/1993 | Japan. |

*Primary Examiner*—David C. Nelms
*Assistant Examiner*—Jordan M. Schwartz
*Attorney, Agent, or Firm*—Cushman, Darby & Cushman IP Group of Pillsbury, Madison & Sutro LLP

[57] ABSTRACT

A semi-apochromatic or apochromatic objective lens system for fluorescence microscopes comprising: a first lens unit which comprises a cemented lens component consisting of a meniscus lens element having a concave surface on the object side and a positive refractive power or a plano-convex lens element, and a meniscus lens element having a concave surface on the object side; a second lens unit which comprises a plurality of cemented lens components; and a third lens unit composed of a cemented lens component which consists, in order from the object side, of a positive lens element and a negative lens element, and has a weak refractive power. This objective lens system has a medium to high magnificaiton and a large numerical aperture, thereby being capable of forming an image having high resolution and high contrast.

5 Claims, 5 Drawing Sheets

SPHERICAL  ASTIGMATISM  COMA  DISTORTION
ABERRATION

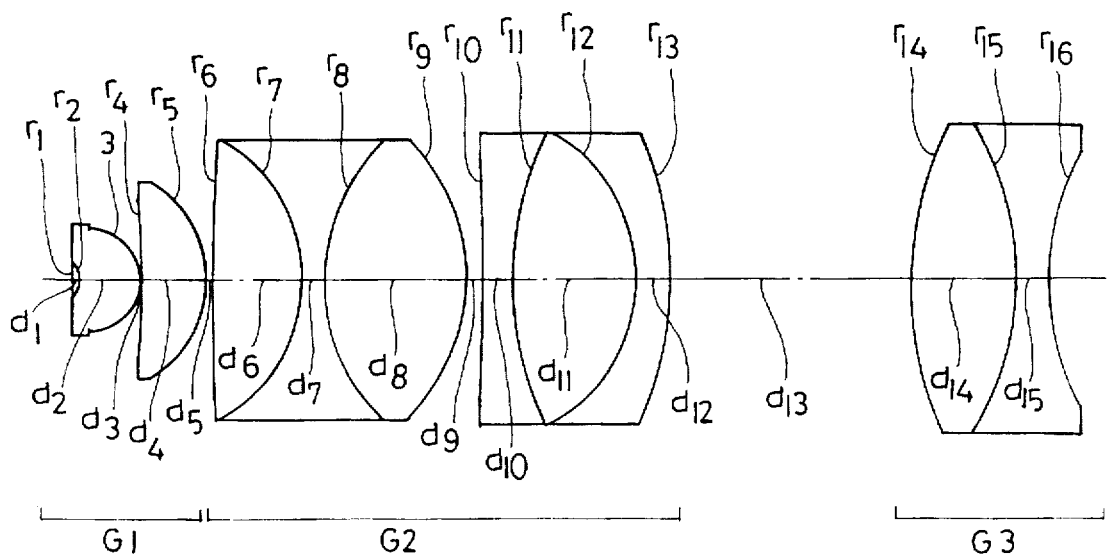
FIG. 3
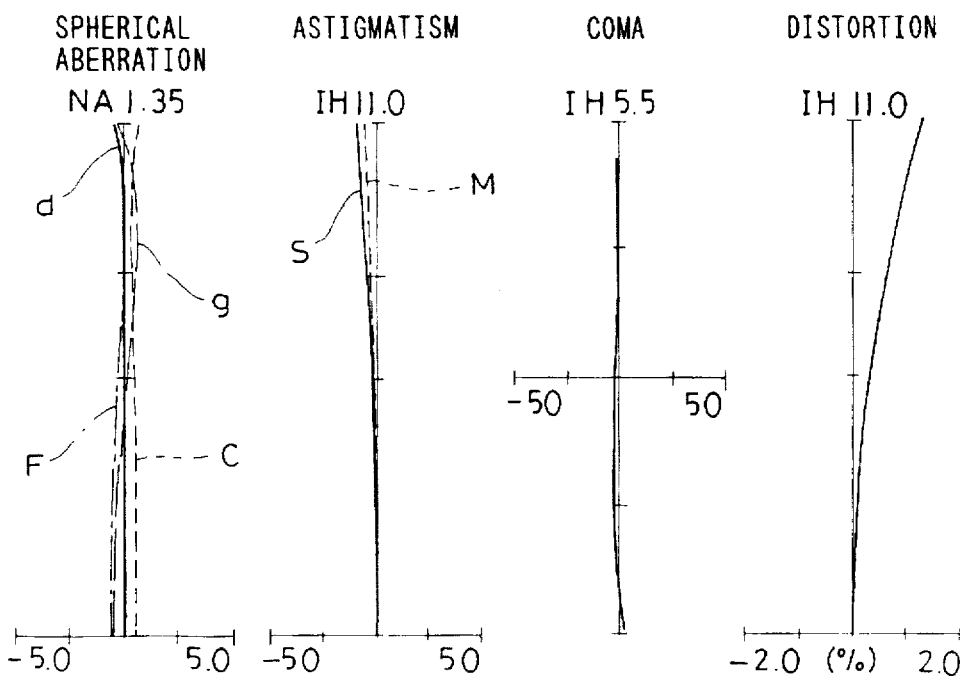
FIG. 4A SPHERICAL ABERRATION NA 1.35
FIG. 4B ASTIGMATISM IH 11.0
FIG. 4C COMA IH 5.5
FIG. 4D DISTORTION IH 11.0

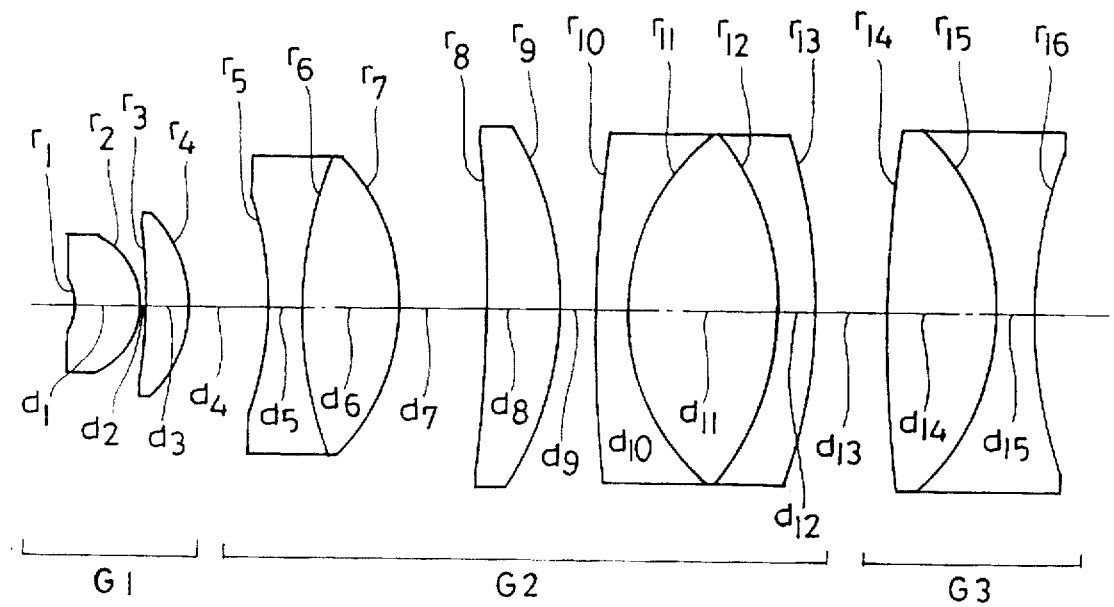
FIG. 7
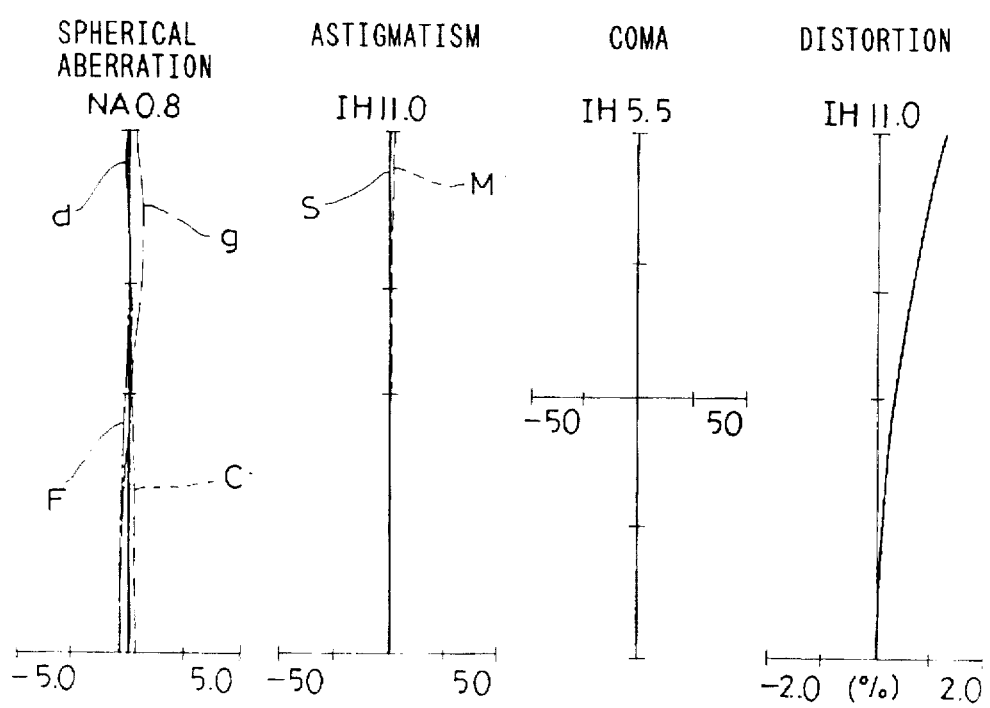
FIG. 8A
SPHERICAL ABERRATION
NA 0.8
FIG. 8B
ASTIGMATISM
IH 11.0
FIG. 8C
COMA
IH 5.5
FIG. 8D
DISTORTION
IH 11.0

OBJECTIVE LENS SYSTEM FOR FLUORESCENCE MICROSCOPES

BACKGROUND OF THE INVENTION a) Field of the Invention

The present invention relates to an apochromatic objective lens system for fluorescence microscopes which has a magnification on the order of x20 to x100, a numerical aperture of at least 0.8 and a favorably corrected secondary spectrum.

b) Description of the Prior Art

In the recent research fields, those which are associated with biology in particular, fluorescence microscopes are widely utilized owing to a merit that these instruments permit observing specimens with no damages on cells when certain substances of the specimens are colored with fluorescent dyes. The fluorescence microscopes are optical instruments used for observing fluorescence which is emitted from the specimens when they are excited by irradiation with rays having short wavelengths. Known as a typical ray which has a short wavelength out of the excitation rays is the i-line (having a wavelength of 365 nm). Further, an excitation ray which has a wavelength of 340 nm is now used for observing calcium ions $c_a$++ existsing in living bodies.

Since the fluorescence microscopes are utilized for observing images formed with rays having the short wavelengths as described above, objective lens systems for fluorescence microscopes must have high transmittance for the rays which have wavelengths down to 340 nm. In addition, since fluorescence emitted from most of the specimens has low intensity, contrast of the images is remarkably lowered when a glass material used for composing the objective lens systems emits fluorescence (autofluorescence) while being irradiated with the excitation rays. As a result, restrictions are imposed on glass materials which are to be used for composing the objective lens systems for fluorescence microscopes. In order to compose the objective lens systems for fluorescence microscopes, it is not allowed to use, for example, not only glass materials which have Abbe's numbers not larger than 35 but also glass materials which have Abbe's numbers not larger than 50 and refractive indices not lower than 1.62. Further, even among glass materials other than those which are mentioned above, only limited kinds of glass materials can be used for composing the objective lens systems for fluorescence microscopes.

As the conventional objective lens system for fluorescence microscopes which have high magnifications and large numerical apertures, there are known lens systems disclosed by Japanese Patents Kokai Publication No. Sho 59-155,822, Kokai Publication No. Sho 61-275,813 and Kokai Publication No. Hei 5-142,477.

Out of the conventional examples mentioned above, the objective lens systems disclosed by Japanese Patents Kokai Publication No. Sho 59-155,822 and Kokai Publication No. Sho 61-275,811 do not use the glass materials for fluorescence optics, thereby being incapable of forming satisfactorily observable images with fluorescence. Further, even if one used hyperchromatic lens elements with the glass materials for fluorescence optics for an objective lens system which is composed as in the conventional examples, one would still find it difficult to correct aberrations in such systems.

Furthermore, the objective lens system disclosed by Japanese Patent Kokai Publication No. Hei 5-142,477 uses the glass materials for fluorescence optics, thereby having a flat image surface and favorably corrected secondary spectrum, but this objective lens system has transmittance as low as 20% for the ray having the wavelength of 340 nm, thereby allowing fluorescence to form only a dark image.

Moreover, an objective lens system for fluorescence microscopes disclosed by Japanese Patent Kokai Publication No. Sho 55-79,406 has transmittance for fluorescence which is improved by using the glass materials for fluorescence optics, but is configured so as to have a numerical aperture as small as 0.65. However, the objective lens system which has the numerical aperture of 0.65 forms an image which is insufficient in brightness thereof since objective lens systems having larger numerical apertures can receive fluorescence in larger amounts and form brighter images which are more legible.

In addition, an objective lens system disclosed by Japanese Patent Kokai Publication No. Sho 61-275,811 has a large numerical aperture of 0.75, but does not allow fluorescence to form an image which is satisfactorily observable due to a fact that the objective lens system does not use the glass materials for fluorescence optics. This objective lens system can hardly correct spherical aberration and chromatic aberration even by using the glass materials for fluorescence optics.

SUMMARY OF THE INVENTION

A primary object of the present invention is to provide a semiapochromatic or apochromatic objective lens system for fluorescence microscopes which corrects both spherical aberration and chromatic aberration by using the glass materials for fluorescence optics, and has a magnification within a range from a medium level to a high level and a large numerical aperture, thereby allowing fluorescence to form an image observable at high resolution and at high contrast.

The objective lens system for fluorescence microscopes according to the present invention has a composition illustrated in FIG. 1, for example, or consists of a first lens unit $G_1$ comprising, in order from the object side, a cemented lens component consisting of a meniscus lens element which has a concave surface on the object side and a positive refractive power or a plano-convex lens element, and a meniscus lens element which has a concave surface on the object side; a second lens unit $G_2$ comprising a plurality of cemented lens components; and a third lens unit $G_3$ composed of a cemented lens component consisting, in order from the object side, of a positive lens element and a negative lens element. The objective lens system for fluorescence microscopes according to the present invention is configured so as to satisfy the following conditions (1) and (2):

$$n_{3p} < 1.62 \tag{1}$$

$$35 < v_{3p} < 55 \tag{2}$$

wherein the reference symbol $n_{3p}$ represents a refractive index of the positive lens element disposed in the third lens unit $G_3$ and the reference symbol $v_{3p}$ designates an Abbe's number of the positive lens element disposed in the third lens unit $G_3$.

The objective lens system for fluorescence microscopes according to the present invention adopts, for obtaining improved optical performance for fluorescence, glass materials which scarecely emit autofluorescence and have high transmittance for the excitation ray within the ultraviolet region (having a wavelength of 340 nm). However, most of these glass materials have low refractive indices, thereby making it difficult for one to obtain a flat image surface or it obliges to more or less sacrifice flatness of the image surface of the objective lens system for fluorescence microscopes according to the present invention.

Taking the point described above into consideration, the above-mentioned conditions (1) and (2) have been selected.

It is general that most of glass materials selected for the first lens unit $G_1$ and the second lens unit $G_2$ have relatively large Abbe's numbers so that these lens units will converge rays as remarkably as possible and produce chromatic aberration in an amount as small as possible. However, it is impossible to configure these lens units so as to produce no chromatic aberration at all. In order to cancel chromatic aberration produced by the first lens unit $G_1$ and the second lens unit $G_2$ with chromatic aberration produced in an opposite direction by a rear lens unit (the third lens unit $G_3$), a glass material having a small Abbe's number is selected for the positive lens element of the cemented lens component disposed in the rear lens unit (the third lens unit $G_3$). However, a glass material which has an Abbe's number not larger than 35 cannot be used as a glass material having high performance for fluorescence as already described above. For this reason, the positive lens element disposed in the third lens unit $G_3$ inevitably has an Abbe's number which is larger than 35 as defined by the above-mentioned condition (2). Further, a glass material having an Abbe's number of 55 or larger will make it impossible to correct lateral chromatic aberration.

On a premise that the objective lens system for fluorescence microscopes according to the present invention is to have a magnification on the order of x20, it is desirable that the second lens unit $G_2$ of a front lens unit (the first lens unit $G_1$ and the second lens unit $G_2$) has a composition which comprises a lens component having a positive refractive power and that the objective lens system is configured so as to satisfy the following condition (3):

$$0.7 < f_1/f < 1.4 \quad (3)$$

wherein the reference symbol f represents a focal length of the objective lens system as a whole and the reference symbol $f_1$ designates a focal length of the first lens unit $G_1$.

The condition (3) is required for allowing the first lens unit to adequately converge diverging rays coming from a specimen surface so that spherical aberration and coma can be corrected. If the upper limit of 1.4 of the condition (3) is exceeded, the first lens unit $G_1$ will have a weak refractive power, thereby being lowered in a capability thereof to correct spherical aberration. If the lower limit of 0.7 of the condition (3) is exceeded, the first lens unit $G_1$ will have too strong a refractive power, thereby undercorrecting spherical aberration and coma.

Further, it is desirable to configure the second lens unit $G_2$ so as to satisfy the following condition (4):

$$2 < f_2/f < 6 \quad (4)$$

wherein the reference symbol $f_2$ represents a focal length of the second lens unit $G_2$.

The condition (4) is required for correcting aberrations which are produced at a stage where the rays converged by the first lens unit $G_1$ are led, while further being converged, to the third lens unit $G_3$. If the upper limit of 6 of the condition (4) is exceeded, the second lens unit $G_2$ will have a weak refractive power, thereby undercorrecting curvature of field. If the lower limit of 2 of the condition (4) is exceeded, in contrast, the second lens unit $G_2$ will have too strong a refractive power, thereby undercorrecting spherical aberration and chromatic aberration.

Furthermore, in embodiments such as embodiments 3 and 4, as one can best view in FIGS. 5 and 7, it is desirable to configure the second lens unit $G_2$ so as to satisfy the following condition (5):

$$\nu_{2p-1} > 70 \quad (5)$$

wherein the reference symbol $\nu_{2p-1}$ represents an Abbe's number of the single-lens element component having the positive refractive power in the second lens unit $G_2$.

By selecting a glass material having such a large Abbe's number as defined by the condition (5) for the lens component which has the positive refractive power for remarkably deflecting rays, it is possible to reduce chromatic aberration to be produced by surfaces of this lens component. Further, a glass material which satisfies the above-mentioned condition (5) is effective also for improving optical performance for fluorescence since it scarecely produces autofluorescence and has high transmittance for the ultraviolet excitation ray.

In addition, it is desirable, for the objective lens system for fluorescence microscopes according to the present invention, to configure the second lens unit $G_2$ so as to have a composition which comprises a cemented lens component consisting of a negative lens element, a positive lens element and a negative lens element which satisfy the following conditions (6) and (7):

$$25 < \nu_{2p-2} - \nu_{2N-1} \quad (6)$$

$$25 < \nu_{2p-2} - \nu_{2N-2} \quad (7)$$

wherein the reference symbols $\nu_{2p-2}$, $\nu_{2N-1}$ and $\nu_{2N-2}$ represent Abbe's numbers of the positive lens element, the object side negative lens element and the image side negative lens element respectively disposed in the second lens unit $G_2$.

The conditions (6) and (7) define the Abbe's numbers of the positive lens element and the negative lens elements to be used for composing the cemented lens component consisting of the three lens elements in the second lens unit $G_2$ so that both longitudinal chromatic aberration and lateral chromatic aberration can be corrected favorably. Further, the secondary spectrum can be corrected extremely favorably by using glass materials having extraordinarily dispersing characteristics for these three lens elements. If the condition (6) or (7) is not satisfied, it will be impossible to sufficiently correct chromatic aberration.

BRIEF DESCRIPTION OF THE DRAWINGS

FIG. 3 shows a sectional view illustrating a composition of a second embodiment of the objective lens system for fluorescence microscopes according to the present invention;

FIG. 4A, FIG. 4B, FIG. 4C and FIG. 4D show graphs illustrating aberration characteristics of the second embodiment of the present invention;

FIG. 7 shows a sectional view illustrating a composition of a fourth embodiment of the objective lens system for fluorescence microscopes according to the present invention;

FIG. 8A, FIG. 8B, FIG. 8C and FIG. 8D show curves visualizing aberration characteristics of the fourth embodiment of the present invention.

DETAILED DESCRIPTION OF THE PREFERRED EMBODIMENTS

Figure 1:
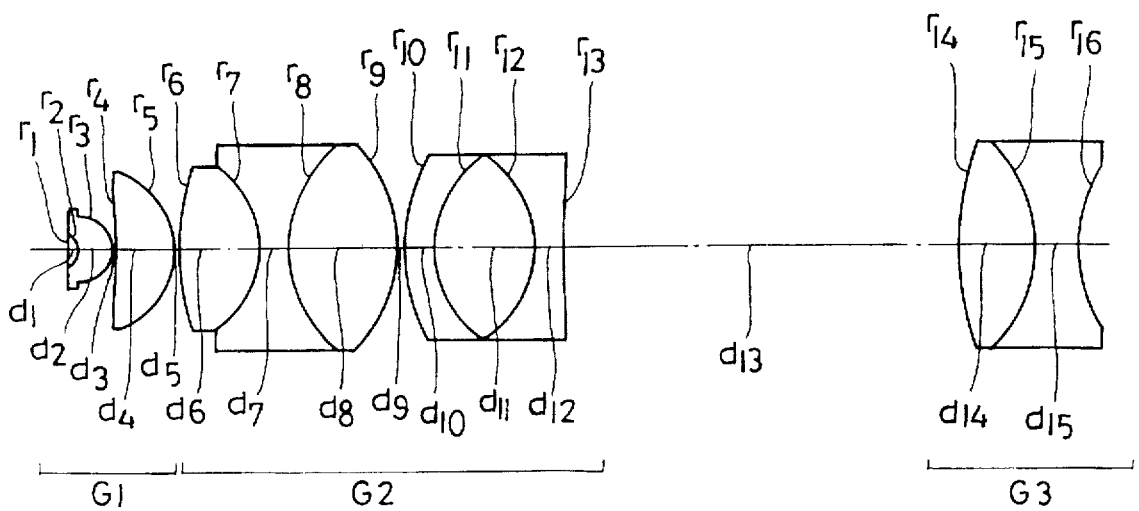
FIG. 1 shows a sectional view illustrating a composition of a first embodiment of the objective lens system for fluorescence microscopes according to the present invention.
Figures 2A, 2B, 2C, 2D:
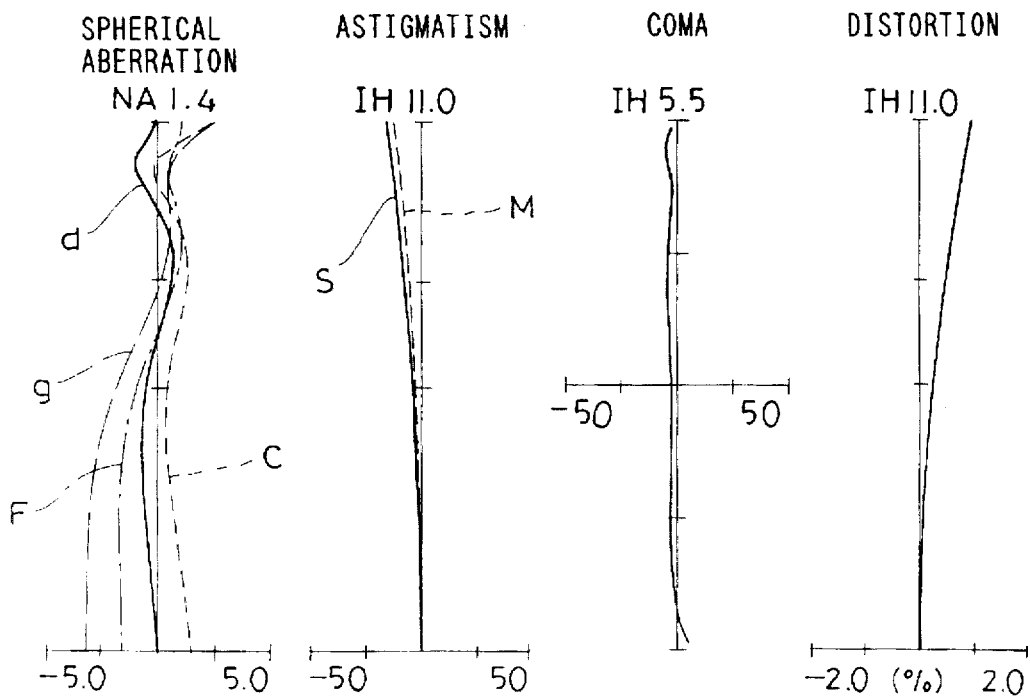
FIG. 2A, FIG. 2B, FIG. 2C and FIG. 2D show graphs illustraing aberration chracteristics of the first embodiment of the present invention.

Now, the objective lens system for fluorescence microscopes according to the present invention will be described in more detail below with reference to the preferred embodiments thereof illustrated in the accompanying drawings and given in the form of the numerical data listed below:

| Embodiment 1 |  |  |  |
|---|---|---|---|
| $f = 1.8, NA = 1.4, \beta = 100, WD = 0.14$ |  |  |  |
| $r_1 = \infty$ |  |  |  |
|  | $d_1 = 0.41$ | $n_1 = 1.51633$ | $v_1 = 64.15$ |
| $r_2 = -1.086$ |  |  |  |
|  | $d_2 = 1.55$ | $n_2 = 1.7865$ | $v_2 = 50$ |
| $r_3 = -1.564$ |  |  |  |
|  | $d_3 = 0.15$ |  |  |
| $r_4 = -30.686$ |  |  |  |
|  | $d_4 = 2.6$ | $n_3 = 1.497$ | $v_3 = 81.1$ |
| $r_5 = -3.964$ |  |  |  |
|  | $d_5 = 0.19$ |  |  |
| $r_6 = 12.019$ |  |  |  |
|  | $d_6 = 3.67$ | $n_4 = 1.43389$ | $v_4 = 95.15$ |
| $r_7 = -4.675$ |  |  |  |
|  | $d_7 = 1.19$ | $n_5 = 1.53172$ | $v_5 = 48.9$ |
| $r_8 = 6.124$ |  |  |  |
|  | $d_8 = 4.94$ | $n_6 = 1.43389$ | $v_6 = 95.15$ |
| $r_9 = -6.824$ |  |  |  |
|  | $d_9 = 0.3$ |  |  |
| $r_{10} = 9.6$ |  |  |  |
|  | $d_{10} = 1.31$ | $n_7 = 1.58144$ | $v_7 = 40.75$ |
| $r_{11} = 4.993$ |  |  |  |
|  | $d_{11} = 4.8$ | $n_8 = 1.43389$ | $v_8 = 95.15$ |
| $r_{12} = -5.017$ |  |  |  |
|  | $d_{12} = 1.19$ | $n_9 = 1.6779$ | $v_9 = 55.33$ |
| $r_{13} = 62.495$ |  |  |  |
|  | $d_{13} = 17.79$ |  |  |
| $r_{14} = 14.433$ |  |  |  |
|  | $d_{14} = 3.55$ | $n_{10} = 1.58144$ | $v_{10} = 40.75$ |
| $r_{15} = -6.3963$ |  |  |  |
|  | $d_{15} = 1.98$ | $n_{11} = 1.50378$ | $v_{11} = 66.81$ |
| $r_{16} = 7.7597$ |  |  |  |
| $n_{3p} = 1.58144, v_{3p} = 40.75$ |  |  |  |
| $v_{2p-2} - v_{2N-1} = 54.40, v_{2p-2} - v_{2N-2} = 39.82$ |  |  |  |

| Embodiment 2 |  |  |  |
|---|---|---|---|
| $f = 4.5, NA = 1.35, \beta = 40, WD = 0.13$ |  |  |  |
| $r_1 = \infty$ |  |  |  |
|  | $d_1 = 0.3$ | $n_1 = 1.50378$ | $v_1 = 66.81$ |
| $r_2 = -1.437$ |  |  |  |
|  | $d_2 = 2.78$ | $n_2 = 1.7865$ | $v_2 = 50$ |
| $r_3 = -2.379$ |  |  |  |
|  | $d_3 = 0.1$ |  |  |
| $r_4 = -32.904$ |  |  |  |
|  | $d_4 = 3.01$ | $n_3 = 1.497$ | $v_3 = 81.1$ |
| $r_5 = -5.323$ |  |  |  |
|  | $d_5 = 0.27$ |  |  |
| $r_6 = 118.406$ |  |  |  |
|  | $d_6 = 4.1$ | $n_4 = 1.43875$ | $v_4 = 94.97$ |
| $r_7 = -7.835$ |  |  |  |
|  | $d_7 = 1.09$ | $n_5 = 1.58144$ | $v_5 = 40.75$ |
| $r_8 = 9.387$ |  |  |  |
|  | $d_8 = 6.7$ | $n_6 = 1.497$ | $v_6 = 81.1$ |
| $r_9 = -9.398$ |  |  |  |
|  | $d_9 = 0.84$ |  |  |
| $r_{10} = -111.954$ |  |  |  |
|  | $d_{10} = 1.49$ | $n_7 = 1.59551$ | $v_7 = 39.21$ |
| $r_{11} = 15.816$ |  |  |  |
|  | $d_{11} = 6.06$ | $n_8 = 1.43389$ | $v_8 = 95.15$ |
| $r_{12} = -7.781$ |  |  |  |
|  | $d_{12} = 1.6$ | $n_9 = 1.6779$ | $v_9 = 55.33$ |
| $r_{13} = -17.072$ |  |  |  |
|  | $d_{13} = 11.2$ |  |  |
| $r_{14} = 18.693$ |  |  |  |
|  | $d_{14} = 4.82$ | $n_{10} = 1.58144$ | $v_{10} = 40.75$ |
| $r_{15} = -14.515$ |  |  |  |
|  | $d_{15} = 1.56$ | $n_{11} = 1.50378$ | $v_{11} = 66.81$ |
| $r_{16} = 13.056$ |  |  |  |
| $n_{3p} = 1.58144, v_{3p} = 40.75$ |  |  |  |
| $v_{2p-2} - v_{2N-1} = 55.94, v_{2p-2} - v_{2N-2} = 39.82$ |  |  |  |

| Embodiment 3 |  |  |  |
|---|---|---|---|
| $f = 9, NA = 0.8, \beta = 20, WD = 0.83$ |  |  |  |
| $r_1 = -2.757$ |  |  |  |
|  | $d_1 = 2.9$ | $n_1 = 1.7865$ | $v_1 = 50$ |
| $r_2 = -3.43$ |  |  |  |
|  | $d_2 = 0.17$ |  |  |
| $r_3 = -26.297$ |  |  |  |
|  | $d_3 = 2$ | $n_2 = 1.56907$ | $v_2 = 71.3$ |
| $r_4 = -6.142$ |  |  |  |
|  | $d_4 = 2.7$ |  |  |
| $r_5 = -11.135$ |  |  |  |
|  | $d_5 = 1.5$ | $n_3 = 1.59551$ | $v_3 = 39.21$ |
| $r_6 = 19.488$ |  |  |  |
|  | $d_6 = 4.5$ | $n_4 = 1.43389$ | $v_4 = 95.15$ |
| $r_7 = -8.585$ |  |  |  |
|  | $d_7 = 4.21$ |  |  |
| $r_8 = -70.158$ |  |  |  |
|  | $d_8 = 3.68$ | $n_5 = 1.56907$ | $v_5 = 71.3$ |
| $r_9 = -14.333$ |  |  |  |
|  | $d_9 = 0.41$ |  |  |
| $r_{10} = -104.259$ |  |  |  |
|  | $d_{10} = 1.6$ | $n_6 = 1.6134$ | $v_6 = 43.84$ |
| $r_{11} = 10.768$ |  |  |  |
|  | $d_{11} = 7$ | $n_7 = 1.43389$ | $v_7 = 95.15$ |
| $r_{12} = -12.709$ |  |  |  |
|  | $d_{12} = 1.7$ | $n_8 = 1.59551$ | $v_8 = 39.21$ |
| $r_{13} = -24.249$ |  |  |  |
|  | $d_{13} = 4.99$ |  |  |
| $r_{14} = 34.346$ |  |  |  |
|  | $d_{14} = 5$ | $n_9 = 1.58144$ | $v_9 = 40.75$ |
| $r_{15} = -14.391$ |  |  |  |
|  | $d_{15} = 1.7$ | $n_{10} = 1.48749$ | $v_{10} = 70.2$ |
| $r_{16} = 21.826$ |  |  |  |
| $n_{3p} = 1.58144, v_{3p} = 40.75, f_1/f = 0.73, f_2/f = 4.124$ |  |  |  |
| $v_{2p-1} = 71.3, v_{2p-2} = 95.15, v_{2N-1} = 43.84$ |  |  |  |
| $v_{2N-2} = 39.21, v_{2p-2} - v_{2N-1} = 51.31$ |  |  |  |
| $v_{2p-2} - v_{2N-2} = 55.94$ |  |  |  |

| Embodiment 4 |
|---|
| $f = 9, NA = 0.8, \beta = 20, WD = 0.85$ |
| $r_1 = -2.609$ |

-continued

Embodiment 4

| | | | |
|---|---|---|---|
| $r_2 = -3.451$ | $d_1 = 2.9$ | $n_1 = 1.617$ | $v_1 = 62.79$ |
| $r_3 = -27.007$ | $d_2 = 0.19$ | | |
| $r_4 = -6.033$ | $d_3 = 2$ | $n_2 = 1.497$ | $v_2 = 81.1$ |
| $r_5 = -15.403$ | $d_4 = 3.49$ | | |
| $r_6 = 20.224$ | $d_5 = 1.5$ | $n_3 = 1.59551$ | $v_3 = 39.21$ |
| $r_7 = -10.035$ | $d_6 = 4.5$ | $n_4 = 1.497$ | $v_4 = 81.1$ |
| $r_8 = -73.493$ | $d_7 = 4.05$ | | |
| $r_9 = -15.8$ | $d_8 = 3.49$ | $n_5 = 1.497$ | $v_5 = 81.1$ |
| $r_{10} = 62.596$ | $d_9 = 1.65$ | | |
| $r_{11} = 10.509$ | $d_{10} = 1.6$ | $n_6 = 1.6134$ | $v_6 = 43.84$ |
| $r_{12} = -13.357$ | $d_{11} = 7$ | $n_7 = 1.43389$ | $v_7 = 95.15$ |
| $r_{13} = -27.168$ | $d_{12} = 1.7$ | $n_8 = 1.59551$ | $v_8 = 39.21$ |
| $r_{14} = 67.229$ | $d_{13} = 3.27$ | | |
| $r_{15} = -11.796$ | $d_{14} = 5$ | $n_9 = 1.59551$ | $v_9 = 39.21$ |
| $r_{16} = 22.04$ | $d_{15} = 1.7$ | $n_{10} = 1.50378$ | $v_{10} = 66.81$ |

$n_{3p} = 1.59551$, $v_{3p} = 39.21$, $f_1/f = 1.012$, $f_2/f = 2.662$
$v_{2p-1} = 71.3$, $v_{2p-2} = 95.15$, $v_{2N-1} = 43.84$
$v_{2N-2} = 39.21$, $v_{2p-2} - v_{2N-1} = 51.31$
$v_{2p-2} - v_{2N-2} = 55.94$ wherein the reference symbols $r_1$, $r_2$, ... represent radii of curvature on surfaces of respective lens elements, the reference symbols $d_1$, $d_2$, ... designate thicknesses of the respective lens elements and airspaces reserved therebetween, the reference symbols $n_1$, $n_2$, ... denote refractive indices of the respective lens elements, the reference symbols $v_1$, $v_2$, ... represent Abbe's numbers of the respective lens elements, the reference symbol β designates a magnification, and the reference symbol WD denotes a working distance.

A first embodiment of the present invention has a composition illustrated in FIG. 1, wherein a first lens unit $G_1$ is composed of a cemented plano-convex lens component which consists of a plano-convex lens element and a meniscus lens element, and a positive meniscus lens component having a concave surface on the object side; a second lens unit $G_2$ is composed of a cemented lens component which consists of a positive lens element, a negative lens element and a positive lens element, and another cemented lens component which consists of a negative lens element, a positive lens element and a negative lens element; and a third lens unit $G_3$ is composed of a cemented meniscus lens component which consists of a positive lens element and a negative lens element, and has a convex surface on the object side.

A second embodiment of the present invention has a composition illustrated in FIG. 3 which is similar to that of the first embodiment, except for a meniscus shape which is selected in the second embodiment for the cemented lens component consisting of the three lens elements and disposed on the image side in the second lens unit $G_2$.

Figure 5:
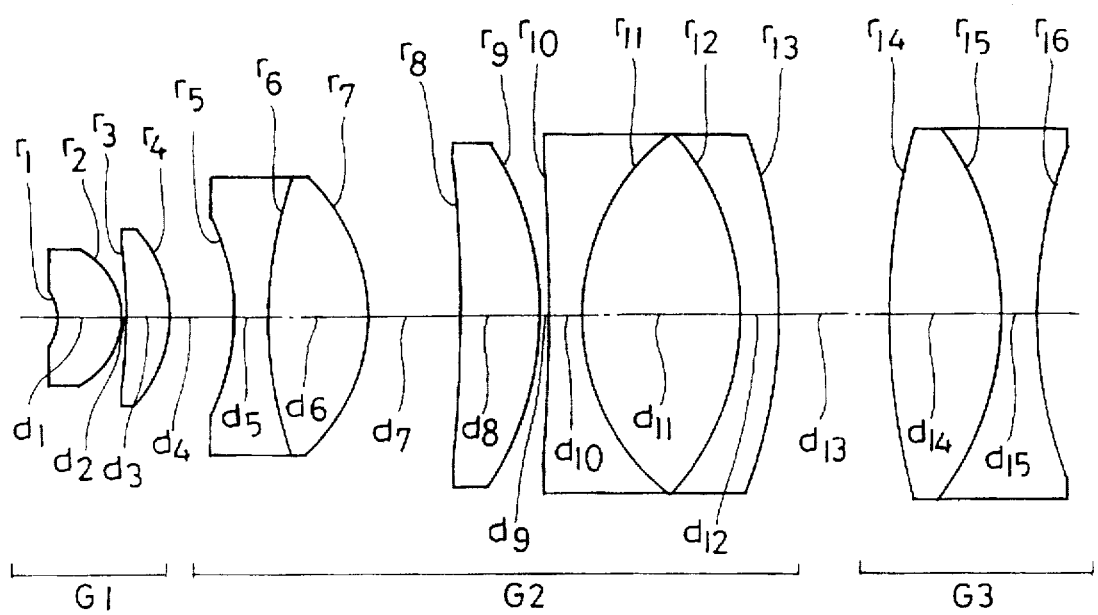
FIG. 5 shows a sectional view illustrating a composition of a third embodiment of the objective lens system for fluorescence microscopes according to the present invention.
Figures 6A, 6B, 6C, 6D:
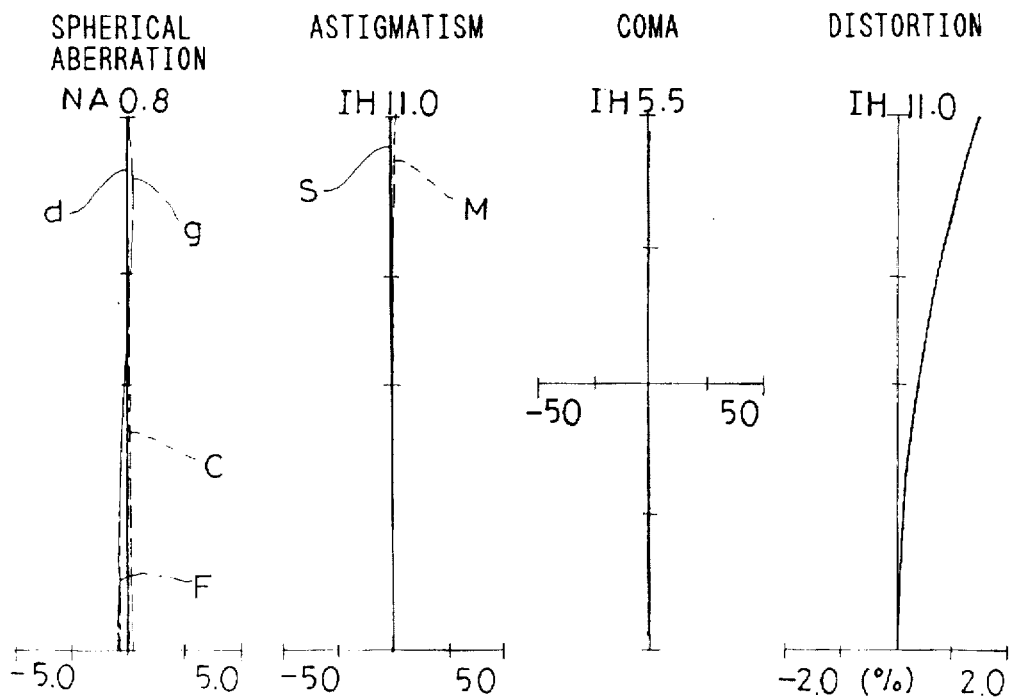
FIG. 6A, FIG. 6B, FIG. 6C and FIG. 6D show curves visualizing aberration characteristics of the third embodiment of the present invention.

A third embodiment of the present invention has a composition illustrated in FIG. 5, wherein a first lens unit $G_1$ is composed of two meniscus lens components each of which has a concave surface on the object side; a second lens unit $G_2$ is composed of a cemented meniscus lens component which consists of a negative lens element and a positive lens element, and has a concave surface on the object side, a meniscus lens component which has a concave surface on the object side, and another cemented lens component which consists of a negative lens element, a positive lens element and a negative lens element; and a third lens unit $G_3$ is composed of a cemented meniscus lens component which consists of a positive lens element and a negative lens element, and has a convex surface on the object side.

A fourth embodiment of the present invention has a composition illustrated in FIG. 7 which is similar to that of the third embodiment described above.

Figure 9:
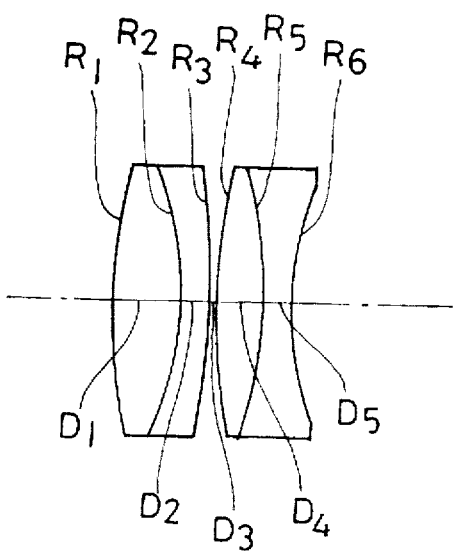
FIG. 9 shows a sectional view illustrating a composition of an imaging lens system which is to be used in combination with the embodiments of the objective lens system for fluorescence microscopes according to the present invention.

Each of the embodiments of the present invention is configured so as to form an image of an object at infinite distance and to be practically used in combination with an adequate imaging lens system for forming an image of an object at a predetermined location. FIG. 9 exemplifies an imaging lens system which is to be used in combination with each of the embodiments of the present invention and has the numerical data listed below:

| | | | |
|---|---|---|---|
| $R_1 = 68.7541$ | $D_1 = 7.7321$ | $N_1 = 1.48749$ | $V_1 = 70.2$ |
| $R_2 = -37.5679$ | $D_2 = 3.4742$ | $N_2 = 1.8061$ | $V_2 = 40.95$ |
| $R_3 = -102.8477$ | $D_3 = 0.6973$ | | |
| $R_4 = 84.3099$ | $D_4 = 6.0238$ | $N_3 = 1.834$ | $V_3 = 37.16$ |
| $R_5 = -50.71$ | $D_5 = 3.0298$ | $N_4 = 1.6445$ | $V_4 = 40.82$ |
| $R_6 = 40.6619$ | | | | wherein the reference symbols $R_1$, $R_2$, ... represent radii of curvature on surfaces of respective lens elements of the imaging lens system, the reference symbols $D_1$, $D_2$, ... designate thicknesses of the respective lens elements of the imaging lens system and an airspace reserved therein, the reference symbols $N_1$, $N_2$, ... denote refractive indices of the respective lens elements of the imaging lens system, and the reference symbols $V_1$, $V_2$, ... represent Abbe's numbers of the respective lens elements of the imaging lens system.

When combined with the imaging lens system illustrated in FIG. 9, the first embodiment, the second embodiment, the third embodiment and the fourth embodiment of the present invention have aberration characteristics illustrated in FIG. 2A, FIG. 2B, FIG. 2C, FIG. 2D; FIG. 4A, FIG. 4B, FIG. 4C, FIG. 4D; FIG. 6A, FIG. 6B, FIG. 6C, FIG. 6D; and FIG. 8A, FIG. 8B, FIG. 8C, FIG. 8D respectively.

The objective lens system for fluorescence microscopes according to the present invention has high transmittance for the ray having the wavelength of 340 nm, favorably corrected aberrations, a medium or high magnification and a large numerical aperture, thereby permitting observation of an image formed with fluorescence at high resolution and high contrast.

I claim:

1. An objective lens system for fluorescence microscopes comprising, in order from an object to an image side:
    a first lens unit comprising a lens component which has a convex surface on the image side and a positive refractive power;
    a second lens unit comprising a plurality of cemented lens components; and
    a third lens unit comprising a cemented lens component which consists, in order from the object side, of a positive lens element and a negative lens element,
    wherein the lens component which is disposed in said first lens unit and has the positive refractive power is a cemented lens component consisting of a plano-convex lens element and a meniscus lens element having a concave surface on the object side, and wherein said objective lens system satisfies the following conditions:

$0.7 < 1f_1/f < 1.4$ $2 < f_2/f < 6$ $n_{3p} < 1.62$ $35 < v_{3p} < 55$ wherein the reference symbols $f_1$ and $f_2$ represent focal lengths of the first lens unit and the second lens unit respectively, the reference symbol f designates a focal length of said objective lens system as a whole, and the reference symbols $n_{3p}$ and $v_{3p}$ represent a refractive index and an Abbe's number, respectively, of the positive lens element disposed in said third lens unit.

2. An objective lens system for fluorescence microscopes comprising in order from the object side:

a first lens unit comprising a lens component which has a convex surface on the image side and a positive refractive power;

a second lens unit comprising a plurality of cemented lens components; and a third lens unit comprising a cemented lens component which consists, in order from the object side, of a positive lens element and a negative lens element, wherein the lens component which is disposed in said first lens unit and has the positive refractive power is a meniscus lens component having a concave surface on the object side, and wherein said objective lens system satisfies the following conditions (1), (2), (3) and (4):

$n_{3p} < 1.62$ (1)

$35 < v_{3p} < 55$ (2)

$0.7 < f_1/f1.4$ (3)

$2 < f_2/f < 6$ (4)

wherein the reference symbols $n_{3p}$ and $v_{3p}$ represent a refractive index and an Abbe's number, respectively, of the positive lens element disposed in said third lens unit, the reference symbols $f_1$ and $f_2$ represent focal lengths of the first lens unit and the second lens unit, respectively, and the reference symbol f designates a focal length of said objective lens system as a whole.

3. An objective lens system for fluorescence microscopes according to claim 1 or 2 wherein said second lens unit further comprises a positive lens element which satisfies the following condition (5):

$v_{2p-1} > 70$ (5)

wherein the reference symbol $v_{2p-1}$ represents an Abbe's number of said positive lens element.

4. An objective lens system for fluorescence microscopes according to claim 1 or 2 wherein said second lens unit comprises a cemented triplet which consists of a negative lens element, a positive lens element and a negative lens element disposed in this order, and satisfies the following conditions (6) and (7):

$25 < v_{2p-2} - v_{2N-1}$ (6)

$25 < v_{2p-2} - v_{2N-2}$ (7)

wherein the reference symbol $v_{2p-2}$ represents an Abbe's number of the positive lens element disposed in said cemented triplet, the reference symbol $v_{2N-1}$ designates an Abbe's number of the negative lens element disposed on the object side in said cemented triplet and the reference symbol $v_{2N-2}$ denotes an Abbe's number of the negative lens element disposed on the image side in said cemented triplet.

5. An objective lens system for fluorescence microscopes according to claim 3 wherein said second lens unit further comprises a cemented triplet which consists of a negative lens element, a positive lens element and a negative lens element disposed in this order, and satisfies the following conditions (6) and (7):

$25 < v_{2p-2} - v_{2N-1}$ (6)

$25 < v_{2p-2} - v_{2N-2}$ (7)

wherein the reference symbol $v_{2p-2}$ represents an Abbe's number of the positive lens element disposed in said cemented triplet, the reference symbol $v_{2N-1}$ designates an Abbe's number of the negative lens element disposed on the object side in said cemented triplet and the reference symbol $v_{2N-2}$ denotes an Abbe's number of the negative lens element disposed on the image side in said cemented triplet.

* * * * *